Patented Jan. 2, 1951

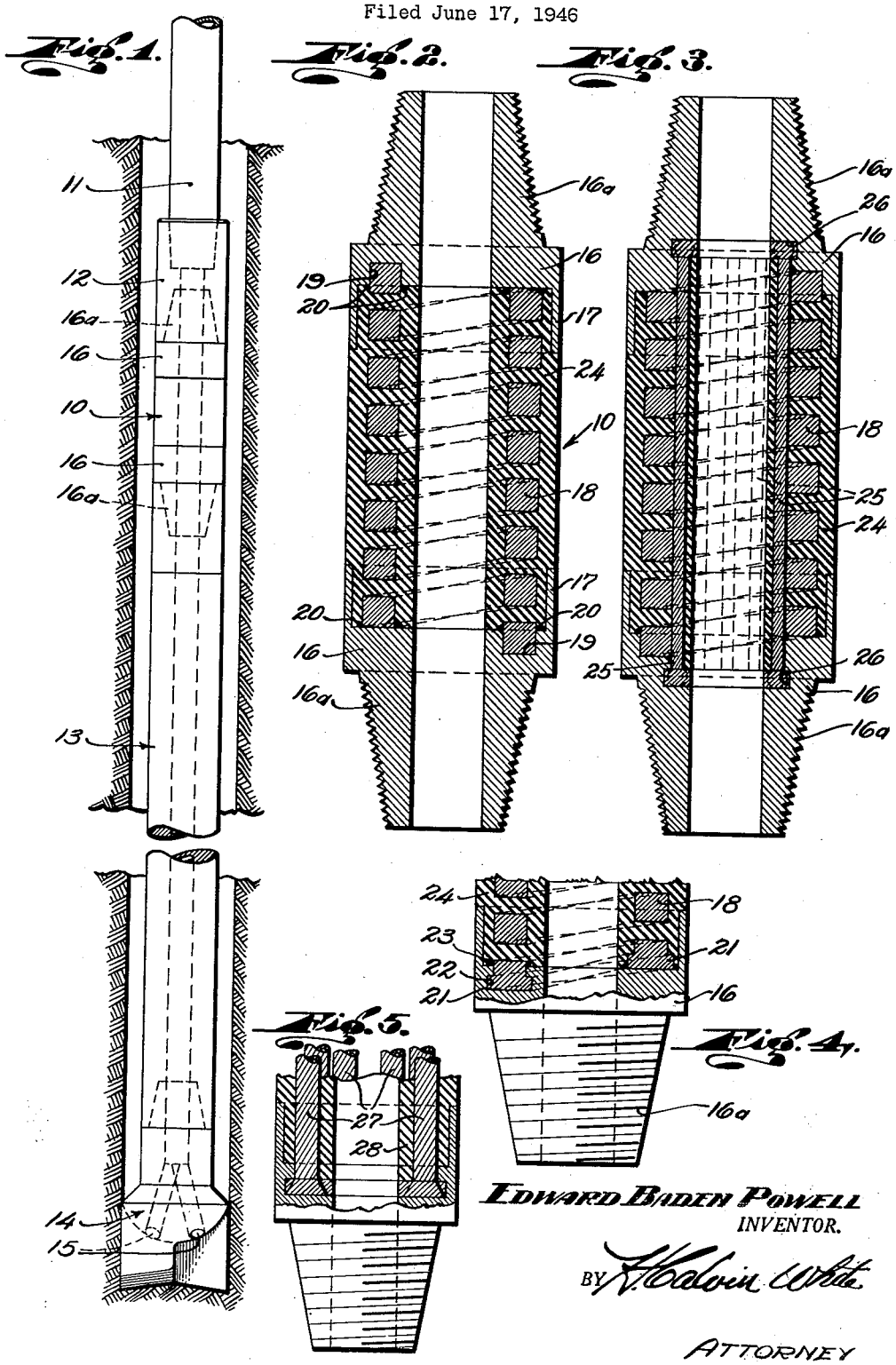

2,536,216

UNITED STATES PATENT OFFICE 2,536,216

FLEXIBLE CONNECTIONS IN DRILL PIPE STRINGS

Edward Baden Powell, San Diego, Calif.

Application June 17, 1946, Serial No. 677,306

10 Claims. (Cl. 285—146)

This invention has for its general object to provide a novel type and form of flexible joint for use in well drill pipe strings. Particularly the invention aims to obviate serious conditions resulting in drill pipe failures, by the use of the flexible joint in conjunction or combination with the usual drill collars. The various possibilities and advantages of the present type of joint will be understood from an explanation of its use in association with a drill collar.

In drilling with the ordinary pipe string and drill collar which loads and stabilizes the cutting tool, it frequently happens that the course or deviation of the hole may create lateral deflections of the drill collar which impose such severe strains in the drill pipe at or closely above the top of the drill collar, as to cause the pipe to fail. The result is a "lost" drill collar requiring expensive fishing and washing operations for its recovery, or the necessity of side track drilling past the collar where it cannot be retrieved.

The invention contemplates incorporating in the pipe string at or near the top of the drill collar, a joint characterized by its capacity for flexure and elastic deformations that will permit deflections of the drill collar, and further by its closed formation allowing sealed fluid circulation under all pressures to the cutting tool. The invention aims particularly to incorporate in the flexible joint, any or all of the following properties, which have direct advantageous relation to the most effective maintenance of the drill collar operations, and the transmission of forces between the drill collar and the pipe string above.

First, the joint is designed to have lateral flexibility permitting and compensating all such deflections of the drill collar as may occur, and preferably the joint is given resiliency such that it will restore to a normally straight condition or form after lateral deflection. In addition to lateral resiliency, the joint is made to be axially and resiliently deformable, thus becoming capable of absorbing shocks transmitted between the pipe and drill collar, either in tension or compression. Finally, the joint is given torsional resiliency so that the transmission of torque between the pipe and drill collar is cushioned in either direction of the torque transfer.

When used in any part of the drill string, the joint reduces or absorbs vibrations originating at the drill bit, and effectively prevents impact and fatigue stresses ordinarily tending to deteriorate the drill pipe, particularly when drilling boulders and like formations. Similarly the joint acts as a cushion against torsional stresses, and resultant twist-offs, when drilling sticky formations or under all other circumstances causing intermittent winding and release of the drill pipe. When running into or out of the hole, the joint cushions the string against tension or compression forces created for example by the tendency of the drill collars to hang on the wall of the well or casing. When used in appropriate parts of a drill string employed in directional drilling, or under other operations requiring flexure of the drill pipe, the pipe is given additional flexibility at sharp bends.

Specifically, the invention contemplates in its preferred form, a flexible joint including spring means, desirably a single coil spring of such size and strength to be capable of assuming the loads and forces transmitted between the pipe and drill collar, the spring having the combined properties of resilient flexibility against lateral deflection, as well as compression, tension and torque forces. For the formation of a continuously closed pressure resistant joint, the spring is embedded in a rubber body, inherently capable of responding and conforming to the deflections of the spring, and forming with end attachment sections of the joint, a unitary tubular structure.

The various objects and features of the invention, as well as the details of certain typical and preferred embodiments, will be understood to better advantage from the following description of the accompanying drawing, in which:

Fig. 1 is a general view illustrating the use of the flexible joint in conjunction with a drill collar;

Fig. 2 is an enlarged cross-sectional view of the joint;

Fig. 3 is a similar view illustrating a variational embodiment; and

Figs. 4 and 5 are fragmentary sections showing further variational forms of the invention.

Referring first to the general showing of Fig. 1, the flexible joint 10 is shown to interconnect the drill pipe string 11 and coupling 12 with the conventionally illustrated drill collar 13, which may be of any suitable type and design, adapted to carry at its lower end a cutting tool such as the drill bit 14 to which fluid circulation is maintained from the drill string through the collar and passages 15 in the bit. As will be understood, the drill collar 13, because of its length, weight and rigidity serves controllably (by manipulation of the drill pipe) to load the bit and to give generally straight direction to its drilling course. However, deviations from the vertical frequently occur, with the result that the drill collar undergoes lateral deflection with relation to the lower end of the drill string, at or near the top of the drill collar. Accordingly, as previously indicated, one function of the joint 10 is to provide a flexible connection permitting such deflection of the drill collar, while transmitting the forces required for its operations.

Referring to Fig. 2, the joint 10 is shown to comprise end sections 16 for attachment to the drill pipe, and in the particular example of Fig. 1, directly to the drill collar, if desired. Typically, the end sections 16 are shown to be formed as threaded pins 16a, although it will be understood that either or both of the sections may have other connection forms, such as threaded boxes. Annular flange or lip 17 on the inner end of each section, serves to confine the end portions of the spring and rubber body, and protect their direct connections with the sections.

The sections 16 are interconnected by a coaxial coil spring 18 of suitable cross-sectional shape, typically square, and having such size and strength as to meet all the load requirements imposed on the joint. The ends of the spring may be received within spiral recesses 19 and attached to the end sections by welded joints at 20, all in a manner giving the connection at least the tensional strength of the spring. Referring to Fig. 4, the end turns of the spring may, if desired, be given the shape indicated at 21, permitting their reception within the spiral undercut grooves 22 to positively lock the spring in place, additional security being given by welding at 23 along the imbedded sides of the spring.

The coil spring is imbedded in a flexible material 24, preferably rubber, bonded as by vulcanizing to the spring and the inner end surfaces of the section 16. The spring imbedding rubber 24 forms with the end sections a continuously tubular body, permitting closed fluid circulation through the joint, and having sufficient strength to withstand the highest fluid pressures encountered in rotary drilling.

Considering the resilient and elastic characteristics of the joint, it will be apparent that the joint will permit such lateral deflections of the drill collar as may occur, without being subject to the fatigue and breaking stresses imposed on the pipe and tool joints in accordance with the ordinary practice. At the same time, the strength given the joint by the heavy spring safely permits transmission of all forces required for effective drilling. As previously indicated, the axial resiliency of the joint enables it effectively to absorb compression shocks transmitted from the bit during rough drilling, as well as tensional strains, as when the drill collar or bit for any reason tend to hang or bind in the hole. Finally, the capacity of the joint for tortional flexibility permits it to cushion or absorb shocks tending to transmit for any reason between the pipe string and drill collar by their relative rotation in either direction.

In accordance with the variational form shown in Fig. 3, provision is made for a safety connection between the end sections 16 in the event the spring should fail. For this purpose I provide one or more interconnections between the sections 16 which are independent of the spring and remain intact in the event of its failure. Typically, the end sections are shown to be interconnected by wire cables 25, of which there may be any suitable number imbedded in circular arrangement within the rubber 24, and terminally connected with the sections 16 as within socket recesses 26. The cables 25 normally may be sufficiently slack as to permit all normal flexures and deformation of the joint, and thereby avoid interference with the flexibility given by the spring and rubber. Upon failure of the spring, the slack cables then assume the load and permit removal of the joint intact.

A further variational form shown in Fig. 5 contemplates using in place of the spring, a circular arrangement of strong cables 27 imbedded in the rubber 28 and normally in taut condition to assume tensional loads. As will be apparent, the joint has lateral flexibility, as well as capacity for tortional deformation with sustained strength by reason of the combined strengths of the multiplicity of cables.

I claim:

1. A resilient joint adapted to be connected in a well drill pipe string and to transmit movements of an upper portion of the string to a tool carried thereby, comprising tubular threaded end attachment sections, and a resiliently flexible fluid passing body including a spring interconnecting said sections for transmission of said movements.

2. A resilient joint adapted to be connected in a well drill pipe string and to transmit movements of an upper portion of the string to a tool carried thereby, comprising tubular threaded end attachment sections, and a resiliently and laterally flexible fluid passing body including a spring interconnecting said sections for transmission of said movements.

3. A resilient joint adapted to be connected in a well drill pipe string and to transmit movements of an upper portion of the string to a tool carried thereby, comprising tubular threaded end attachment sections, spring means in annular form resiliently interconnecting said sections, and a tubular fluid passing body of rubber bonded to and embedding said spring means.

4. A resilient joint for connecting stands of a well pipe string and transmitting movements of an upper portion of the string to a tool carried thereby, comprising a pair of threaded tubular end sections for attachment to the pipe string, and resiliently flexible fluid passing means interconnecting said sections, said fluid passing means including a continuously closed wall fluid passing tubular rubber body between said end sections, and a metallic connector attached to said sections.

5. A resilient joint for connecting stands of a well pipe string and transmitting movements of an upper portion of the string to a tool carried thereby, comprising a pair of threaded tubular end sections for attachment to the pipe string, and fluid passing means interconnecting said sections and adapted for resilient lateral flexure, said fluid passing means including a continuously closed wall fluid passing tubular rubber body between said end sections, and a metallic connector attached to said sections.

6. A resilient joint for connecting stands of a well pipe string and yieldingly transmitting movements of an upper portion of the string to a tool carried thereby, comprising a pair of threaded end sections for attachment to the pipe string, and resiliently flexible fluid passing means interconnecting said sections, said fluid passing means including a continuously closed wall fluid passing tubular rubber body between said end sections, and a spring attached to said sections and yieldingly resisting flexure of said fluid passing means.

7. A resilient joint for connecting stands of a well pipe string and yieldingly transmitting movements of an upper portion of the string to a tool carried thereby, comprising a pair of tubular threaded end sections for attachment to the pipe string, and fluid passing means interconnecting and communicating with said sections and adapted for resilient, lateral, axial and torsional flexure, said fluid passing means including a continuously closed wall fluid passing tubular rubber body between said end sections, and a coil spring interconnecting said sections and embedded in said body for yieldingly resisting said flexure.

8. A joint adapted to be connected in a well drill pipe string and to transmit movements of an upper portion of the string to a tool carried thereby, comprising tubular threaded end attachment sections, spring means in annular form interconnecting said sections, a tubular fluid passing body of rubber bonded to and embedding said spring means, and means interconnecting said end sections independently of said spring.

9. A joint for connecting stands of a well pipe string and transmitting movements of an upper portion of the string to a tool carried thereby, comprising a pair of threaded tubular end sections for attachment to the pipe string, and laterally and axially flexible fluid passing means interconnecting said sections, said fluid passing means including a continuously closed wall fluid passing tubular rubber body between said end sections, and a metallic connector attached to said sections.

10. A joint for connecting stands of a well pipe string and transmitting movements of an upper portion of the string to a tool carried thereby, comprising a pair of threaded tubular end sections for attachment to the pipe string, and laterally and axially flexible fluid passing means interconnecting said sections, said fluid passing means including a continuously closed wall fluid passing tubular rubber body between said end sections, and a metallic connector attached to said sections, and embedded in said body.

EDWARD BADEN POWELL.

REFERENCES CITED

The following references are of record in the file of this patent:

UNITED STATES PATENTS

| Number | Name | Date |
| --- | --- | --- |
| 1,950,448 | Heisterkamp | Mar. 13, 1934 |
| 1,960,688 | Archer | May 29, 1934 |
| 1,977,175 | Davis | Oct. 16, 1934 |
| 2,016,066 | Bannister | Oct. 1, 1935 |
| 2,038,968 | Summers | Apr. 28, 1936 |
| 2,065,080 | Lee | Dec. 22, 1936 |
| 2,170,627 | Berryman | Aug. 22, 1939 |